United States Patent [19]

Meyer

[11] Patent Number: 4,755,062

[45] Date of Patent: Jul. 5, 1988

[54] PROCESS AND MEASURING PROBE FOR THE DETERMINATION OF ICE OR SNOW FORMATION

[76] Inventor: Friedhelm Meyer, Hof Geisenberg 1, 11 Alertshausen, BRD-5920, Fed. Rep. of Germany

[21] Appl. No.: 102,747

[22] Filed: Sep. 24, 1987

Related U.S. Application Data

[63] Continuation of Ser. No. 774,607, Oct. 10, 1985, abandoned.

[30] Foreign Application Priority Data

Dec. 30, 1983 [DE] Fed. Rep. of Germany ....... 3347650
Mar. 19, 1984 [DE] Fed. Rep. of Germany ....... 3410052

[51] Int. Cl.⁴ .................... G01N 25/04; G08B 19/02; B64D 15/20
[52] U.S. Cl. ...................................... 374/16; 340/581; 244/134 F
[58] Field of Search .................. 374/16, 21, 25; 340/580, 581, 962; 244/134 D, 134 F

[56] References Cited

U.S. PATENT DOCUMENTS

| | | | |
|---|---|---|---|
| 2,269,019 | 1/1942 | Hall | 340/581 |
| 3,298,191 | 1/1967 | Burke | 340/580 |
| 3,412,326 | 11/1968 | Jones et al. | 340/580 |
| 3,517,900 | 6/1970 | Roussel | 374/25 |
| 3,571,709 | 3/1971 | Gaertner | 340/581 |
| 3,594,775 | 7/1971 | Fox | 340/581 |
| 4,037,427 | 7/1977 | Kramer | 340/581 |
| 4,333,004 | 6/1982 | Forgue et al. | 340/580 |
| 4,335,299 | 6/1982 | Belohlavek | 340/580 |

FOREIGN PATENT DOCUMENTS

| | | | |
|---|---|---|---|
| 1573272 | 4/1973 | Fed. Rep. of Germany | 340/580 |
| 1135690 | 1/1985 | U.S.S.R. | 340/580 |

*Primary Examiner*—William A. Cuchlinski, Jr.
*Assistant Examiner*—Thomas B. Will
*Attorney, Agent, or Firm*—Burns, Doane, Swecker & Mathis

[57] ABSTRACT

To be able to determine an ice or snow formation reliably, a cold conductor connected to an electrical power source is provided, with which the heat abstraction intensely occurring due to ice or snow is measured and used as a signal for ice or snow formation. The intensified heat abstraction on the cold conductor is determined by a current meter for determining an increased power consumption or by a thermistor which is in heat-conductive connection with the cold conductor and switches the power supply of the cold conductor on and off as a function of the temperature.

4 Claims, 3 Drawing Sheets 4,755,062

PROCESS AND MEASURING PROBE FOR THE DETERMINATION OF ICE OR SNOW FORMATION

This application is a continuation of application Ser. No. 774,607, filed Oct. 10, 1985, now abandoned.

BACKGROUND OF THE INVENTION

The invention relates to a process and a measuring probe for the determination of ice or snow formation in outdoor installations, such as heated roof guttering and the like, as well as in refrigeration plants.

The invention is based on the object of designing a process and a measuring probe of the stated type such that an exact ice or snow indication can be achieved reliably.

This object is achieved according to the invention by providing a cold conductor connected to an electrical power supply and determining the heat abstraction occurring on the cold conductor, an increased heat abstraction being used as a signal for ice or snow formation.

By the heating capacity of the cold conductor dependent on the ambient temperature and by determining the heat abstraction taking place on the cold conductor, an ice or snow formation can be determined very accurately. If the cold conductor is surrounded by air, which conducts poorly, the heating capacity, or current consumption, is low. If there is water on the cold conductor, heat is admittedly abstracted more intensely from it, but this concerns only a limited amount of heat which is carried away by the cold conductor as the water layer is in turn surrounded by air. If, on the other hand, ice or snow forms on the cold conductor, heat is intensely abstracted from the latter. In this way, an ice formation is very exactly determinable. In addition, the cold conductor can have a very sturdy structure. It operates extremely reliably under the most varied of conditions.

Advantageous developments of the invention are specified in the following description and in the further claims.

THE DRAWINGS

Exemplary embodiments of the invention are explained in more detail below with reference to the drawing, in which:

FIG. 1 shows a circuit of a measuring probe with diagrammatic representation of the structure of the cold conductor, FIG. 1A is a perspective view of a cold conductor, with portions of the outer layers stripped away to expose the inner layers, FIG. 2 shows a circuit diagram of a further embodiment of a measuring probe, and FIG. 3 is a side elevational view of the sensor of FIG. 2, FIG. 4 is a longitudinal sectional view taken through the sensor of FIG. 3, and FIG. 5 is a cross-sectional view taken along the line A-B in FIG. 3.

DESCRIPTION OF PREFERRED EMBODIMENTS OF THE INVENTION

Figure 1:
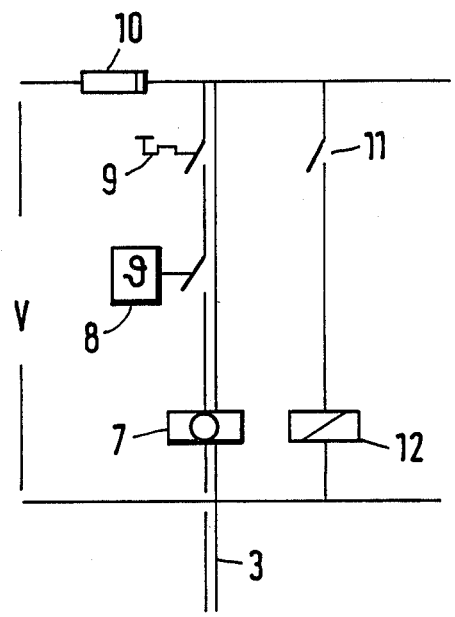
Figure 1A:
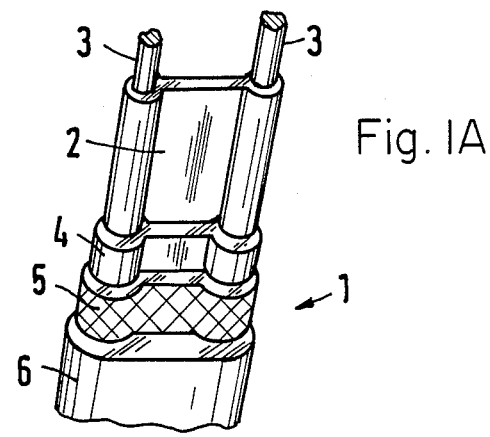

In FIG. 1A, generally denotes a sensor in the form of a plastic band 2, along both edges of which copper lines 3 are embedded. The plastic band 2 consists of a semi-conducting radiation crosslinked plastic with graphite inclusions or a corresponding material the heating capacity of which depends on the ambient temperature in such a way that, with increased temperature of the plastic band 2, the resistance of the latter rises and at lower temperature it becomes less. The plastic band 2 is thus equivalent to a cold conductor which generates less heating capacity with rising ambient temperature and more heating capacity with lower ambient temperature. The plastic band 2 in the form of a cold conductor thus regulates itself, an overheating or burn-out is not possible.

On the plastic band 2 may be fitted an insulating layer 4 as well as a protective jacket 5 made of a wire mesh, which in turn is surrounded by a plastic jacket 6. In this way, the sensor 1 is protected against mechanical damage. The plastic band 2 with the electric lines 3 is preferably flexibly designed. Another form of cold conductor may also be used.

The two electric lines 3 are connected in FIG. 1 to a device 7 measuring the current consumption of the cold conductor, for example a contact ammeter or the like. 8 denotes a single- or multi-stage thermostat which switches the arrangement to operational readiness at a specified outside temperature. Member 9 is a thermal overcurrent relay for protection in cases of short-circuiting or mechanical destruction of the cold conductor or sensor 1 and 10 denotes a control fuse. Via the contact 11 of the contact ammeter 7 is driven an auxiliary contactor 12 for on or off switching or for transmitting an indication. The sensor 1 can be of any length according to the particular line along which is to be measured, for example in a rainwater gutter.

As there is a boost in current consumption when the sensor is switched on, a corresponding delay facility may be provided, by means of which a measurement of the current consumption is not made until a predetermined time has expired.

The sensor 1 is heated by a power source with for example 6 or 220 V. With a plastic band embodied as described of 1 or 2 m length, the heating capacity in air is 18 watts/m, in ice water on the other hand it is 36 watts/m. The increased current consumption with snow and ice formation is registered by the meter, whereupon a thawing facility may be switched on or an ice warning given. The ice formation point can be determined very accurately from the clear difference in heat abstraction on the cold conductor or sensor 1, incorrect measurements are practically excluded.

Such a measuring probe can be used in the most varied of application fields. It is used in particular to save energy costs for roof gutter heating installations, heating systems for facades, open areas, garage entrances and the like. It can be used as a standby thawing control in the case of ice formation of heat pumps in cooling plants and the like. Furthermore, the measuring probe can also be employed as a warning device when there is the danger of black ice on motorways or at airports.

To reduce the energy costs of such a measuring probe, it can be switched on at certain time intervals to make a measurement of the heat abstraction on the cold conductor. After a certain heating time, the measuring probe is switched off again provided that no ice indication has been given in the meantime.

Figure 2:
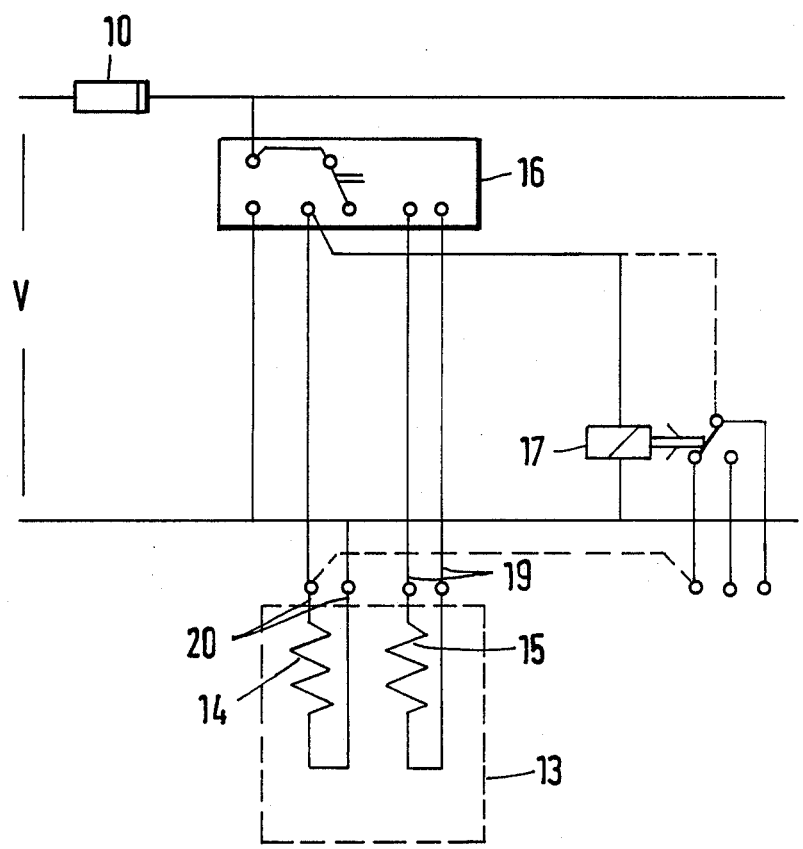
Figure 4:
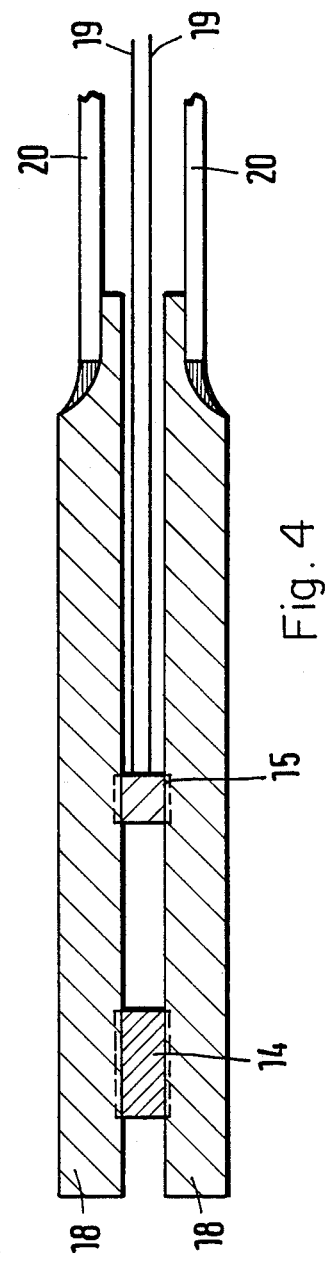

FIG. 2 shows an embodiment of a measuring probe of simplified structure which involves lower costs and operates even more accurately. The sensor is denoted by 13 and it is formed by a cold conductor 14 (PTC resistor) and, assigned to it, a thermistor 15 (NTC resistor), the two lines 14 and 15 being in heat-conduction contact with each other, as FIG. 4 shows. The cold conductor 14 is switched via a control thermostat 16 in between the electric supply lines in which there is a fuse 10. The control thermostat 16 is switched on and off via the thermistor 15. A delayed-response time-lag relay 17 is likewise switched via the control thermostat 16 in between the supply lines. The transmission of the indication signal for ice and snow formation is made via the contact of the time-lag relay 17. The time-lay relay may be set to a response delay time of 1 to 10 minutes, while the control thermostat 16 may be designed for a temperature range from +5° C. to −30° C. with a switching range from 1 to 10° C.

After reaching a certain, predeterminable and manually adjustable temperature, the thermistor 15 switches on the control thermostat 16 and, via the latter, the power supply to the cold conductor 14. If the sensor 13 is surrounded by air, the cold conductor 14 heats up the thermistor 15 so that its temperature rises and, for example within 1.5 minutes, reaches a value at which the thermistor 15 switches off again the thermostat 16 and thus the power supply of the cold conductor 14.

If the delayed-response time-lag relay 17 is set for example to 3 minutes, it has not yet switched through its signal contact at it was only supplied with power for about 1.5 minutes.

In cases of ice, snow or frost formation, more heat is abstracted from the cold conductor 14, so that it can only warm up the thermistor 15 to a reduced extent. With a correspondingly high operating differential of the control thermostat 16 of, for example, 8° C., the heating capacity of the cold conductor 14 is no longer sufficient to bring the thermistor 15 to the temperature at which it switches off the control thermostat 16. It is decisive for this that, although the cold conductor 14 heats highly by intensified heat abstraction, a certain upper limit temperature is not exceeded due to its self-regulation. The thermistor 15 thus remains effective as long as there is ice and snow.

When the sensor 13 is again surrounded by air, renewed measurements are made continually via the thermistor 15 in the specified temperature range under the switching temperature via the time-lag relay. Only when the ambient temperature rises again, for example due to the weather, does the thermistor 15 switch off the measuring probe.

In a modified embodiment, which is shown in broken lines in FIG. 2, the cold conductor 14 is not connected directly, but via the break contact of the time-lag relay 17 to the thermostat 16 and is switched via the latter in between the power supply lines. In this circuit, the thermostat 16, due to its high operating differential, acts as a temperature limiter in the thawing process.

Figure 5:
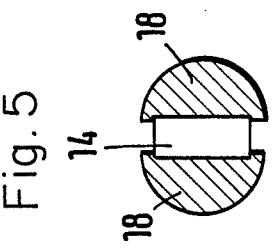
Figure 3:
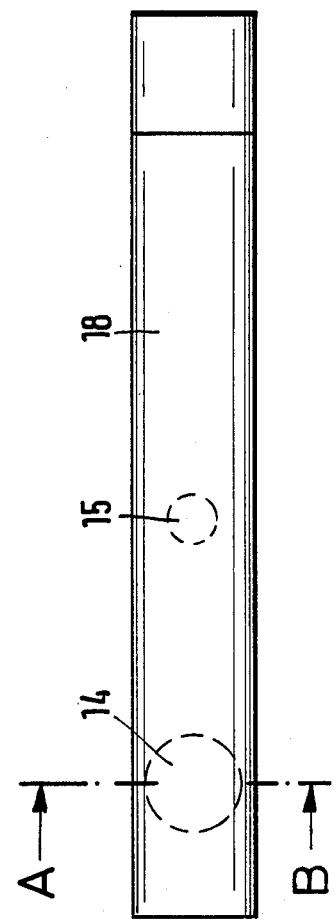

FIGS. 3-5 shows an exemplary embodiment of a sensor 13. The cold conductor or PTC resistor 14 is arranged at a slight distance from the thermistor or NTC resistor 15 between two metal strips 18, which may be made for example of brass, via which the two conductors 14 and 15 are in heat-transfer contact with each other. 19 denotes the lines leading to the thermistor 15, and 20 denotes the lines leading to the cold conductor 14. For clamping the two conductors 14 and 15 between the metal strips 18, the measuring probe may be surrounded by a sleeve.

In a practical embodiment of a measuring probe for the monitoring of ice, snow or frost formation, eg. in an evaporator of a refrigerating machine or in a cooling room, the thermostat 16 is set to a temperature difference of, for example, 10° C., the lower temperature representing the switch-on point and the upper temperature the switch-off point for the power supply of the cold conductor 14. This temperature range is selectable.

The prevailing temperature at the switch-on point of, for example, −30° C. in an evaporator is stored. A second detection time, of for example 3 minutes, is specified. If, within this second detection time, the thermistor 15 is heated up by 10° C. by the cold conductor 14, the power supply of the latter is switched off by the thermistor 15. If, on the other hand, due to an intensified heat abstraction on the cold conductor 14 by ice, the thermistor 15 is not warmed up within the second detection time by 10° C. starting from the stored temperature, a signal for ice formation is transmitted, whereupon a thawing facility may be switched on or else just a warning given.

After switching off the cold conductor 14 upon ice indication and switching on of a thawing heating system, according to an expedient development, the thermistor 15 remains switched on to establish the final temperature or the switch-off point of the thawing heating system.

After switching off the thawing heating system, the thermistor 15 remains switched on in order to switch on the fan of an evaporator in a refrigerating machine. If a predetermined temperature is not reached in a certain time with operation of the fan and of the refrigerating machine, a fault signal is transmitted. In this way, a performance measurement on the state of the refrigerating plant is achieved.

Such a device can undertake the entire temperature control of a cooling room or be switched into a conventional temperature control system.

In the embodiment according to FIG. 1, a time interval after switching or can be set to determine any possible line rupture or short-circuit. If there is a line rupture, no current flows, whereupon a fault signal is transmitted. If there is a short-circuit, increased current flows, which likewise leads to a fault signal. In the same way, in the case of the embodiment according to FIG. 2, a sensor rupture can be determined by the resistance of the thermistor becoming practically infinite, while, in the case of a short-circuit, the resistance becomes virtually zero.

In the case of the arrangement according to FIG. 3, the conductors 14, 15 can be fixed by adhesion or soldering on a carrier material of good heat conductivity or else by press contact by means of spring force, pressure screwing, rivetting, via a shrink-fit sheath or the like. By variation of the distance between thermistor 15 and cold conductor 14, the switching times can be set in broad ranges in relation to the response temperature. In a corresponding way, the heat conductivity of the carrier material 18 can be influenced by appropriate material selection.

In the case of the arrangement of the measuring probe in an evaporator, a slight distance between surface of the sensor and evaporator surface is provided. This prevents premature heat bridging which leads to erroneous signals. An intensified heat removal via the evaporator surface only takes place upon frost formation, the frost crystals forming heat conduction bridges between sensor and evaporator lamellae.

I claim:

1. A measuring probe for determining the presence of ice or snow at a sensed region, said probe including an electrical circuit comprising:

an electrical power supply, thermal switch means for assuming a switch-off position in response to reaching a switch-off temperature and for assuming a switch-on position in response to reaching a switch-on temperature lower than said switch-off temperature, a cold conductor exposed to said sensed region and disposed adjacent said thermal switch means for heating the latter at a first rate when said cold conductor is not exposed to snow or ice and at a slower second rate when said cold conductor is exposed to snow or ice, said first rate being sufficient to heat said thermal switch means to said switch-off position within a given time period, and said second rate being insufficient to heat said thermal switch means to said switch-off position within said time period, whereby the inability of said thermal switch means to assume a switch-off position within said time period is indicative of the presence of ice or snow, control means for disconnecting said cold conductor from said electrical power supply in response to said thermal switch means assuming said switch-off position to thereby terminate the heating of said thermal switch means by said cold conductor, and for connecting said cold conductor to said electrical power supply in response to said thermal switch means assuming said switch-on position, to thereby resume heating of said thermal switch means by said cold conductor, and means actuated in response to said thermal switch means remaining in a switch-on position at the end of said time period.

2. A measuring probe according to claim 1, wherein said thermal switch means is a thermistor.

3. A measuring probe according to claim 1 including a time-lag relay for establishing said given time period, said time-lag relay connected to be actuated in response to said cold conductor being connected to said electrical power supply.

4. A measuring probe according to claim 3, wherein said cold conductor is connected to said electrical power supply through said time-lag relay.

* * * * *